(12) United States Patent
Liu et al.

(10) Patent No.: US 11,609,628 B2
(45) Date of Patent: Mar. 21, 2023

(54) METHOD AND SYSTEM FOR OBTAINING PRODUCT PROTOTYPE BASED ON EYE MOVEMENT DATA

(71) Applicant: CHINA ACADEMY OF ART, Hangzhou (CN)

(72) Inventors: Zheng Liu, Hangzhou (CN); Hongdou Wang, Hangzhou (CN); Zijiao Zhu, Hangzhou (CN); Yun Wang, Hangzhou (CN); Huijun Hu, Hangzhou (CN)

(73) Assignee: CHINA ACADEMY OF ART, Hangzhou (CN)

( * ) Notice: Subject to any disclaimer, the term of this patent is extended or adjusted under 35 U.S.C. 154(b) by 23 days.

(21) Appl. No.: 17/037,238

(22) Filed: Sep. 29, 2020

(65) Prior Publication Data

US 2021/0278895 A1    Sep. 9, 2021

(30) Foreign Application Priority Data

Mar. 9, 2020   (CN) .......................... 202010157004.6

(51) Int. Cl.
| | | |
|---|---|---|
| *G06F 3/01* | (2006.01) | |
| *G06K 9/62* | (2022.01) | |
| *G06T 5/00* | (2006.01) | |
| *G06V 10/44* | (2022.01) | |
| *G06V 40/19* | (2022.01) | |
| *G06V 40/18* | (2022.01) | |
| *G06V 40/10* | (2022.01) | |

(52) U.S. Cl.
CPC ........... *G06F 3/013* (2013.01); *G06K 9/6223* (2013.01); *G06K 9/6272* (2013.01); *G06T 5/002* (2013.01); *G06V 10/44* (2022.01); *G06V 40/10* (2022.01); *G06V 40/19* (2022.01); *G06V 40/193* (2022.01); *G06V 40/197* (2022.01)

(58) Field of Classification Search
CPC ....... G06F 3/013; G06F 3/012; G06V 40/193; G06V 10/44; G06V 40/197; G06K 9/6223; G06K 9/6271
See application file for complete search history.

(56) References Cited

U.S. PATENT DOCUMENTS

2017/0154204 A1* 6/2017 Ryu ..................... G06V 10/462
2020/0409455 A1* 12/2020 Wilson ................. G02B 27/017

* cited by examiner

*Primary Examiner* — Dennis P Joseph
(74) *Attorney, Agent, or Firm* — Muncy, Geissler, Olds & Lowe, P.C.

(57) ABSTRACT

A method and a system for obtaining a product prototype based on an eye movement data. The method comprises the following steps: Obtaining A front-side view of the target product for establishing a underlying sample library; The target product is divided into several detection areas according to its structure or function features, and the eye movement is detected to obtain the fixation time of the target product The invention adopts computer and image collecting technology to process the observation data of human eyes, and adopts K-means clustering to obtain the prototype of the target product, to assist the designer to grasp the categories of personal interest contour, so as to improve the design effect of product appearance.

7 Claims, 6 Drawing Sheets

METHOD AND SYSTEM FOR OBTAINING PRODUCT PROTOTYPE BASED ON EYE MOVEMENT DATA

CROSS-REFERENCE TO RELATED APPLICATIONS

This Non-provisional application claims priority under 35 U.S.C. § 119(a) on Chinese Patent Application No(s). 202010157004.6 filed on Mar. 9, 2020, the entire contents of which are hereby incorporated by reference.

BACKGROUND OF THE INVENTION

Field of the Invention

The invention relates to a method and a system for obtaining a product prototype, more in particular to a method and a system for obtaining a product prototype based on an eye movement data.

Description of the Related Art

With the development of society, the level of people's appreciation of art has gradually improved. For goblets and the like, there is a need for higher artistic contour design, the contour design of existing products such as goblet is usually based on the designer's own design level, and people of different status have different artistic interest in the curve contour, and people of different ages have different preferences for product contours. Designers usually need to communicate in depth. Based on the difference of expression ability, designers have higher communication costs, and the satisfaction of the design often needs the rich experience of the designer himself. The existing computer-aided design system has the following shortcomings: the curve modeling and component modeling are different because of the large quantity of product base and the different methods of product modeling design. At present, the research on the curvilinear modeling of goblet is relatively few, and it is difficult to take the point, and the unified requirement has not been reached.

BRIEF SUMMARY OF THE INVENTION

One of the present invention aims to provide a method and a system for obtaining a product prototype based on an eye movement data, the system and the method pre-processing an image, the pre-processing includes an image contrast enhancement, image background processing, contour pattern processing, color processing, which can make the image is used to identify more specifications and avoid decorative pattern, color and other none-related factors affect human eyes.

One of the present invention aims to provide a method and a system for obtaining a product prototype based on an eye movement data, the system and the method hierarchically analysis a contour, analysis interest situation for human eyes of different layers through obtaining interest points of the contour form the human eyes, to facilitate the analysis which areas the testers' subjective interest points focus and the product category that may be interested in.

One of the purposes of the present invention is to provide a method and a system for obtaining a product prototype based on an eye movement dat. The system and the method analysis by a topological relationship, and is capable of prototyping and restoring of a heterogeneous contour.

To achieve at least one of the above inventive purposes, the invention further provides a method for obtaining a product prototype based on eye movement data, which includes the following steps:

obtaining a front view of a target product to establish an underlying sample library;

dividing the target product into a plurality of detection areas according to a structure feature or a functional feature of the target product;

detecting a human eye movement to obtain a fixation duration of a gaze area of the target product;

obtaining interest weights in different detection areas of the target product by the fixation duration; and obtaining a target product prototype by K-means clustering.

According to a preferred embodiment of the present invention, including identifying an edge contour of the target product to obtain a Bezier curve with feature points; obtaining coordinate values of the feature points, the feature points comprises cut points, corner points, inflection points and endpoints;

According to the present invention a preferred implementation of the invention, including obtaining the interest weights in different detection areas of the target product by the fixation duration; multiplying an interest weight and a coordinate value of a corresponding feature point; clustering the detection areas to obtain a category sample set; and obtaining the target product prototype by K-means clustering according to the number of the category sample set as a target condition.

According to another preferred embodiment of the invention, a step of obtaining a target product prototype comprises: classifying samples in each category sample set by K-means clustering; calculating a coordinate average value of each category sample set to obtain a centroid of each category sample set, calculating a distance between each sample point and the centroid to obtain a prototype sample point closest to the centroid, and calculating a coordinate value of the prototype sample point.

According to another preferred embodiment of the present invention, obtaining the product prototype includes: pre-establishing a product prototype system based on the functional feature and/or the structural feature of the product; analyzing the functional feature and structural feature of prototype samples; and classifying the prototype samples.

According to another preferred embodiment of the present invention, a step of obtaining prototype samples comprises analyzing a heterogeneous product image through a topological relationship of geometric graphics to obtain prototype features of the heterogeneous products.

According to a preferred embodiment of the present invention, a step of establishing the underlying sample library include: establishing a three-dimensional Cartesian coordinate system with X, Y and Z axes for the product, and defining the variables of one of the dimensions of the product outer contour according to the product category when obtaining the front view of the product.

According to a preferred embodiment of the present invention, the step of establishing the underlying sample library further comprises a sample pre-processing steps:

enhancing an image contrast;

blurring a background or setting a solid color background;

setting a same image size and a same resolution; and removing an impurity pattern from an image, and the impurity pattern is not a contoured structure.

According to a preferred embodiment of the present invention, the step of establishing the underlying sample library also include de-coloring the non-black and white color of the image to avoid an interference of impurity color to human eyes.

According to another preferred embodiment of the present invention, the step of obtaining the Bezier curve further includes a corner points screening step:

detecting and obtaining numerical value of the feature points, wherein the feature points comprise true corner points and false corner points;

calculating a curvature value of the feature point and a point adjacent to the feature point, if the curvature value of the feature point is a maxima value, the feature point is assigned as a candidate corner point; and setting a curvature threshold value and screening a true corner point by the curvature threshold value, and dynamically setting the curvature threshold value according to a product category.

According to another preferred embodiment of the present invention, the step of K-means clustering further comprises calculating of a total variance of a combined sample, and the combined sample is merged from small to large according to total variances of different samples.

In order to achieve at least one of the above invention purposes, the invention further provides a method for obtaining an interest product prototype: including:

screening tester, recording health information and personality information of the test personnel, wherein the health information comprises: age, sex, with or without eye disease history, physical condition;

providing a display for displaying product contour information;

installing an eye tracker for detecting eye movements of the tester;

recording a first fixation point, gaze area, eye movement route and fixation duration;

constructing a distribution diagram of interest points according to the fixation duration of the gaze area; and analyzing the tester's preference for product categories according to the tester's health information, personality information, and the distribution diagram of interest points.

According to another preferred embodiment of the invention, the product contour is divided into areas, and the interest area of the tester is obtained according to a distribution of interest points.

According to another preferred embodiment of the invention, an interest line is obtained according to a position of the first fixation point and an eye movement line.

According to another preferred embodiment of the present invention, the step of displaying the contour image of the product include the following steps:

setting a observation threshold time value, and the observation threshold time values from 3 minutes to 10 minutes;

setting a display time of a single product image and an interval time of adjacent product images, in which the display time of a single product is 3-8 seconds and the interval time is 1-4 seconds;

According to another preferred embodiment of the present invention, in the step of displaying the product contour image, the tester's eyeball is 70-100 cm away from the display.

According to another preferred embodiment of the invention, the number of product contour images is 40-100 in the process of displaying product contour images.

In order to achieve at least one of the above invention purposes, the invention further improves a system for obtaining a product prototype based on an eye movement data, including:

a processor comprising at least one analysis module and at least one identification module;

a display being communicated with the processor;

an eye tracker being communicated with the processor and being configured to obtain eye movement information of s tester and transmit the eye movement information to the processor;

the identification module being configured to identify contour information and curve information of a product image;

the analysis module being used for combining the product contour information and eye movement information to obtain the interest area and interest product category of the tester; and the analysis module also being used for analyzing an influence of the health information and personality information of the tester on the product contour area and the preference for product categories.

According to another preferred embodiment of the invention, the analysis module is also used to combine product contour information and eye movement information to obtain the tester's area of interest and product category of interest.

Among them:

1—display, 2—display page, 3—eye tracker, 4—tester, 5—processor.

DETAILED DESCRIPTION OF THE INVENTION

The following description is used to disclose the invention to enable a technician in the field to realize the invention. The preferred embodiments described below are used as examples only, and technicians in the field can think of other obvious variants. The basic principles of the invention as defined in the following description can be applied to other embodiments, deformation schemes, improvement schemes, equivalent schemes and other technical schemes that do not deviate from the spirit and scope of the invention.

The field technician should understand is that in the disclosure of the present invention, the term "vertical", "horizontal" and "up", "down", "before" and "after", "left", "right" and "vertical", "level", "top", "bottom", "inside" and "outside" and so on indicate an orientation or position relationship based on the orientation or position shown in the attached drawings, for the sole purpose of facilitating the description of the invention and simplifying its description, and not to indicate or imply that the device or element to be referred to must have a specific orientation, be constructed and operated in a specific orientation, therefore, the above terms cannot be understood as limiting the invention.

It is understandable that the term "one" shall be understood to mean "at least one" or "one or more", that is, in one embodiment, the number of elements may be one, while in another embodiment the number of elements may be more than one, and the term "One" shall not be understood to be a limitation on quantity.

Prototype samples is a collection of all prototype sample points in a sample library.

Figure 10:
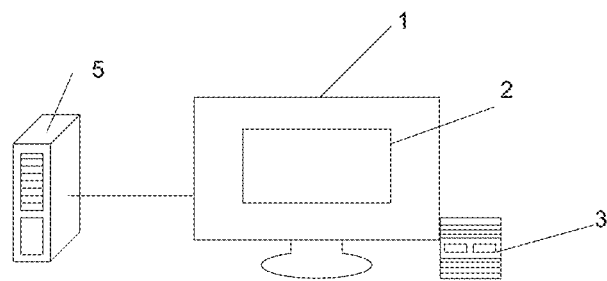
FIG. 10 shows a schematic diagram of a preferred embodiment of the present invention.
Figure 10:
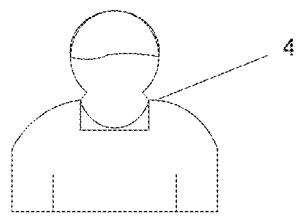

Referring to FIG. 10, a system for obtaining a product prototype based on eye movement data includes a processor 5, a display 1, and an eye tracker 3, wherein the display is communicated with the eye tracker 3, the eye tracker 3 is used for acquiring eye movement information of a tester 4 and transmitting eye movement information to the processor 5, and the display 1 is communicated with the processor 5, the display 1 is used for displaying a contour information, a curve information of the product.

It is worth mentioning that the processor 5 includes an identification module, which is used to identify the contour information and curve information from the product image; in a preferred implementation, the identification module is used to identify each pixel in the image and establish a coordinate system of the product image. Therefore, each pixel in the product image has a corresponding coordinate value, where a starting position of the coordinate system can be fixed according to a resolution of the image and a position of the monitor 1. The processor 5 receives product image information, in which a source of product image information includes but is not limited to internet downloading, user filming and uploading, on-site design, etc. It is understood that the method of obtaining product image information is not limited by the invention.

Described further, the processor 5 may include a first analysis module and a second analysis module, the first analysis module analysis the contour, the curve, and the interest points of the area of tester 4 for the product, and establish an interest distribution image of each tester for each product, the first module also further analysis a position information of the first fixation point and an eyeball rotation line of the tester 4, the position information of the first fixation point and the eyeball rotation line of the tester 4 are saved for judging the interest points or interest lines of the tester.

Figure 5:
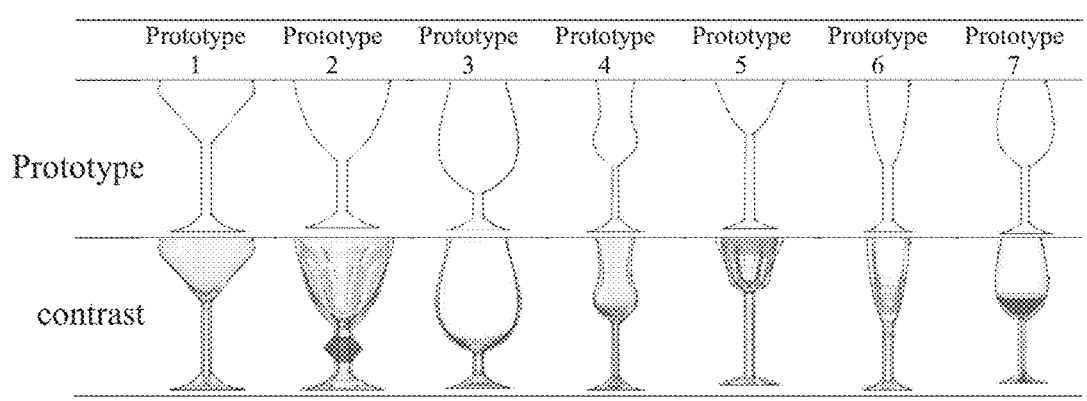
FIG. 5 shows a view of the goblet prototype in a preferred embodiment of the invention.
Figure 6:
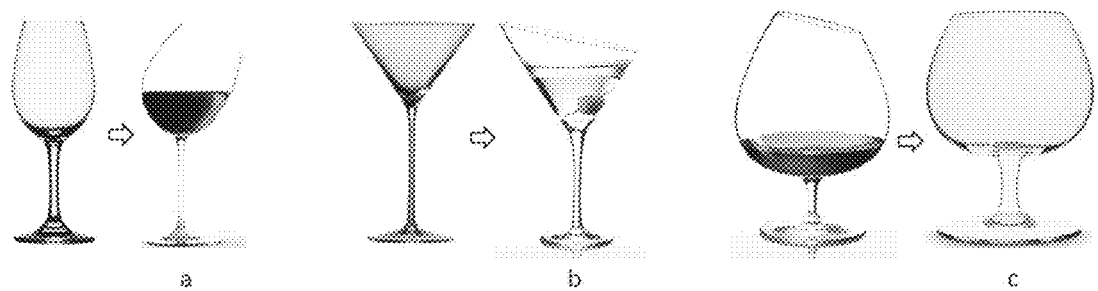
FIG. 6 shows a schematic diagram of a prototype goblet corresponding to a heterogeneous goblet in a preferred embodiment of the invention.

Further, as shown in FIG. 5-6, the first analysis module is also used to analyze structural characteristics and functional characteristics of the product, and for the heterogeneous products that are not regular, the prototype of the product can be analyzed through a geometric topological relationship.

It is worth mentioning that the processor 5 also saves health characteristics and personality characteristics of the tester 4, including age, gender, history of eye disease, physical condition, etc., personality characteristics can be obtained by a personality quiz test on the tester 4, the second analysis module further analysis a influence of product category and tester's own factor, based on the obtained interest distribution diagram of each product of the tester 4 combined with the health information and personality information of the tester 4, etc. Therefore, the system can be used to further improve the designer's understanding of the user's design requirements and points of interest, interest graphics and contours, and improve the effectiveness of the design.

It should be noted that the eye tracker 3 is installed at the display 1 and detects the eye information of tester 4 through a camera and an infrared sensor. The eye information includes eye rotation information, eye rotation path, eye fixation time, eye saccade distance and pupil size. The display 1 is placed directly in front of tester 4 and keeps a certain distance from the eyeballs of tester 4, so that the tester 4 can directly observe the product image information at a reasonable sight distance.

The invention requires an eye movement test. Prior to the test, tester 4 should be screened. According to the physical condition of tester 4, persons with eye diseases such as color blindness and amblyopia should be screened. In addition, according to a mental condition of the tester, the tester with better mental condition was further selected to avoid an influence of the tester's own factors on the test results. In a preferred embodiment, the eye movement test included the following steps:

screening testers 4: equal proportion of male and female subjects, with normal vision, without eye disease and in a good mental condition.

preparing equipment: prepare an eye-tracker 3 and an eye-tracker data analysis software, and install the eye-tracker 3 at the monitor 1.

placing the monitor 1 directly in front of the tester 4.

Test materials and methods: select the number of product image samples, and set the display time of an image sample for a single product and the interval time between two adjacent samples.

Test processing: participants were informed of the specific test content and time, and clearly informed of the product image information they needed to observe. Test results: The data diagram was obtained by the eye tracker 3, a hot spot map, a fixation point and a trajectory diagram and so on were analyzed by the eye movement data analysis software, the hot spot map can be used to find the visual objects most likely to attract users' attention, compare a strength of each visual object in terms of how well it attract the attention, and to refer to multiple users' data and display the data results simultaneously.

Test data processing: divide the interest area of product parts according to the hot spot map, and obtain a fixation duration.

In order to consider the possibility of a visual fatigue, the number of the product image in this invention of 30-100 sheets, the display of each product image on the display 1 is 3 to 8 seconds, the time interval between adjacent product images is 1-5 seconds, the display interval is used to eliminate an effect of the previous image on the tester 4, where a distance between the tester's eyeball and the monitor 1 is 60-120 cm, preferably 90 cm.

Figure 1:
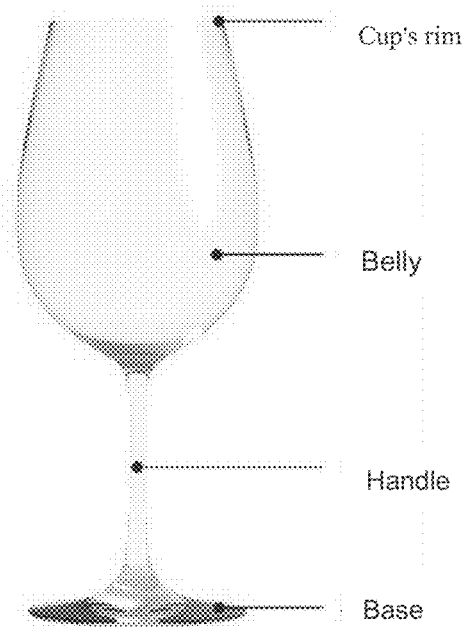
FIG. 1 shows a schematic diagram of a front view of a goblet in a preferred embodiment of the invention.
Figure 2:
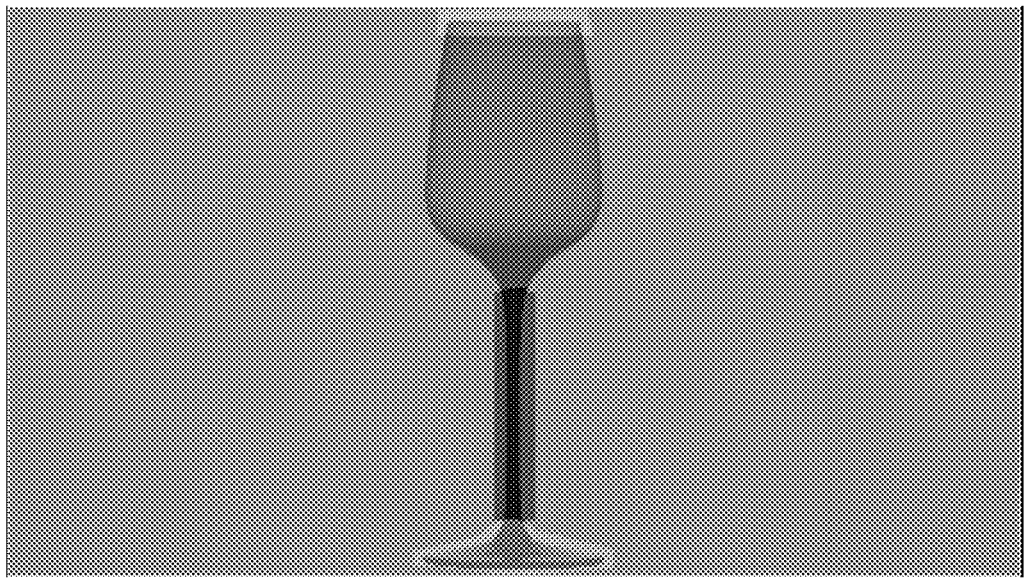
FIG. 2 shows a schematic diagram of a distribution of goblet detection areas in a preferred embodiment of the invention.
Figure 3:
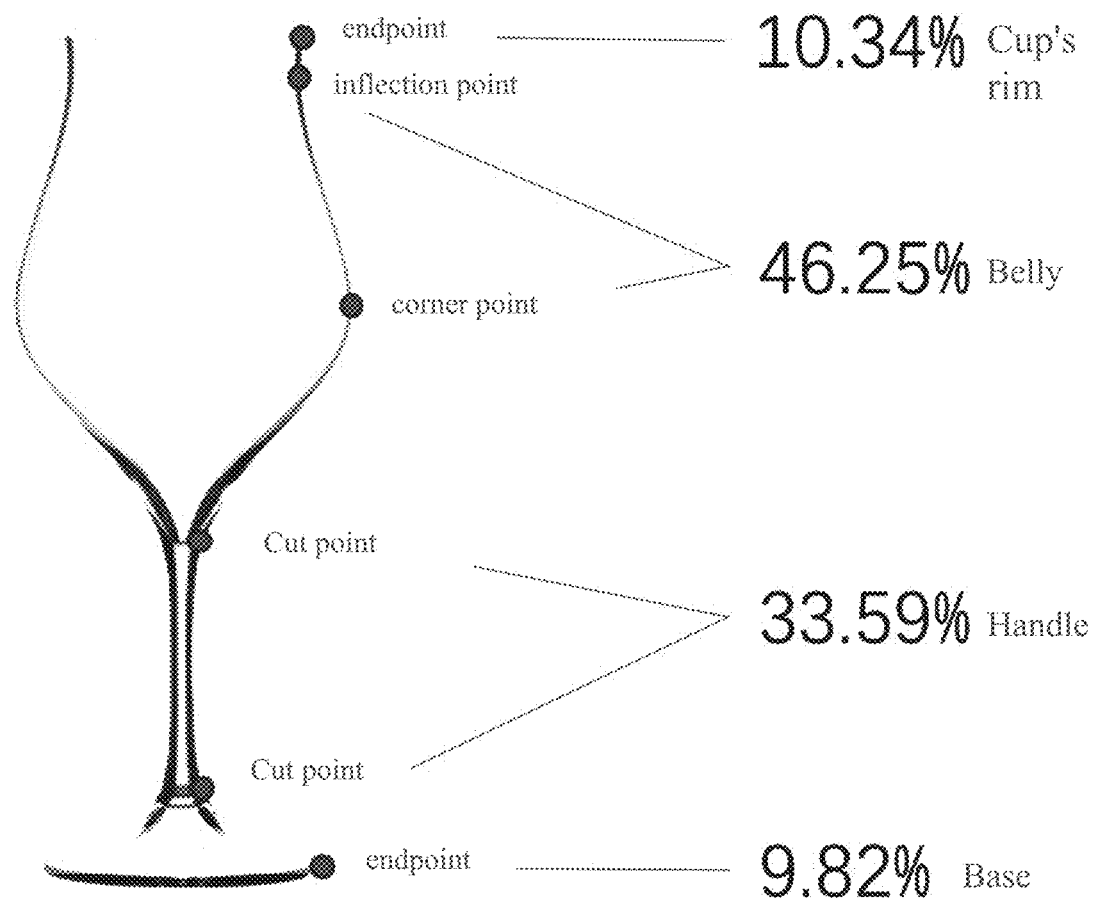
FIG. 3 shows a schematic diagram of an interest weight distribution in different detection areas of the goblet in a preferred embodiment of the invention.

Please refer to FIG. 1-10. Taking a goblet as an example, the invention illustrates the technical content and technical effect of the invention:

According to a function and a structure of the goblet, the goblet is divided into several detection areas, as shown in FIG. 1-2. The detection areas include:

a cup's rim: the cup's rim belongs to the cup belly. According to the shape characteristics of the goblet, a cup's rim size and a cup belly shape influence each other.

a cup belly: the contour of a side of the cup belly has a characteristic curve of oblique, arc, or curve and so on, the contour is the main contour structure of the goblet;

a cup handle: the cup handle is connected with the base and the cup belly, and a length of the cup handle shall be determined by the shape and structure of the cup belly;

a base: used to support the goblet, the contour of the side of the base changes little.

The steps for identify the contour of the goblet include:

obtain a goblet image information, the image information includes a goblet pixel and the corresponding coordinate information of each pixel;

hierarchical clustering was carried out for each detection area to classify the goblet samples;

the identification module identifies the outer contour of the goblet image, converts the outer contour into a Bezier curve, and searches for the coordinate values of the feature points such as tangent points, corner points, inflection points and endpoint in the Bezier curve;

obtain a fixation duration of each detection area, and obtain the interest distribution of different detection areas according to the fixation duration;

Analyze the user's interest product category according to the classified product and the detected interest data.

includes the following steps: Firstly, the goblet samples were divided into K primitive clusters in the classification process, and then a distance from one sample point to an centroid of each category is calculated, the objects were assigned to the nearest category, the calculated clustering centroid and the clustering centroid lose the object is different, repeat this step until all the objects are not assigned to other categories after the termination of the operation.

In the invention, the outer contour structure of the goblet is used as the original cluster of k-value clustering according to the functions of the goblet, for example, the goblet can be divided into red wine cup, sweet wine cup, brandy wine cup, champagne wine cup, etc., calculate the coordinates of each contour pixel in all goblet samples, and compare the coordinates to the prototype goblet of each category to calculate the goblet closest to the category, and classify the goblet at the same time, please note that, the invention assigns the goblet to the prototype of the closest category by calculating a variance of the coordinates of each goblet sample and classification prototype, in other words, in the process of classifying the goblet, a category prototype library characterized by function and structure is pre-establish. The category prototype library saves the coordinate data including the contour of the prototype goblet. When the goblet samples are obtained, the coordinate values of the goblet samples are calculated, and the variance between the sample goblet and the prototype coordinates is calculated, and the

TABLE 1

| parts | | Sample 1 | Sample 2 | Sample 3 | Sample 4 | Sample 5 | Samples of 6 | ... | Samples of 57 |
|---|---|---|---|---|---|---|---|---|---|
| Participant No. 1 | cup's rim | 133 | 0 | 0 | 157 | 0 | 0 | ... | 0 |
| | belly | 1716 | 3073 | 0 | 2185 | 3322 | 3385 | ... | 3432 |
| | handle | 671 | 1029 | 3526 | 0 | 344 | 109 | ... | 0 |
| | base | 0 | 1029 | 1186 | 0 | 1045 | 0 | ... | 624 |
| Participant No. 2 | cup's rim | 0 | 0 | 0 | 0 | 278 | 0 | ... | |
| | belly | 4397 | 452 | 0 | 4290 | 3463 | 2917 | ... | 4337 |
| | handle | 0 | 2184 | 3586 | 141 | 0 | 0 | ... | 0 |
| | base | 0 | 0 | 0 | 0 | 0 | 0 | ... | 0 |
| ... | ... | ... | ... | ... | ... | ... | ... | ... | ... |
| Participant No. 20 | cup's rim | 0 | 0 | 0 | 1023 | 0 | 0 | ... | 1522 |
| | belly | 3463 | 967 | 1154 | 2698 | 3650 | 2886 | ... | 1124 |
| | handle | 0 | 3837 | 3588 | 250 | 545 | 0 | ... | 0 |
| | base | 140 | 0 | 0 | 0 | 0 | 781 | ... | 0 |

As shown in table 1 above, the fixation duration in different areas of different samples.

Table 2 shows the weight of fixation time in different detection areas:

TABLE 2

| parts | The glass | A cup of belly | handle | The base | A total of |
|---|---|---|---|---|---|
| Total staring time | 659673 | 2950662 | 2142978 | 626497 | 6379810 |
| The weight | 10.34% | 46.25% | 33.59% | 9.82% | 100% |

Figure 4:
FIG. 4 shows interest points of human eyes at the goblet in a preferred embodiment of the invention.

It should be noted that the darker the color represents the area with the more interest points of the goblet and longer fixation duration, as shown in FIG. 4, according to the hot spot map of the interest distribution obtained by Tobii EyeX 2.1.1, it can be seen that the belly part is the most interested area of the whole goblet.

Further, the invention adopts hierarchical clustering method to cluster the goblet, in which the hierarchical clustering adopts the K-means clustering, the method goblet sample as the prototype with the smallest total variance is classified. It is necessary to explain that because a shape design of each category of goblet has certain differences, therefore, in a preferred embodiment of the invention, an average value of coordinates is calculated for a plurality of goblets of the same category and is used as a standard prototype coordinate data.

Further, in order to obtain an appropriate number of category features, the present invention takes a length of fixation duration in different detection areas as a weight, the weight multiplies the coordinate of each goblet sample, and classifies the goblet samples by K-means clustering method according to the number of categories.

It is worth mentioning that in the process of the goblet samples need to collect the goblet contour curve and feature points, wherein feature points include: corner points, endpoints, inflection points, cut points, and wherein false corners may appear in the corner points when in an actual operation, so you need to set and adjust a threshold to get true corner points, as follows:

detecting and obtaining numerical values of the feature points, wherein the feature points comprise true corner points and false corner points;

calculating a curvature value between each feature point and a point adjacent to the feature point, if the curvature value of one feature point is a maxima value, the one feature point is assigned as a candidate corner point; and setting a curvature threshold value and screening a true corner point by the curvature threshold value, and dynamically setting the curvature threshold value according to a product category.

It should be noted that a maximum curvature of the feature points may have false corner points because the product structures are different, so it is necessary to manually set and adjust the curvature threshold, that is, dynamically adjust the threshold value according to the different product structure.

In a preferred embodiment, the contour identification method also includes image preprocessing steps for the goblet sample using an image processing software including but not limited to Photoshop and Image Lab, in particularly, the image processing steps include:

enhancing an image contrast;
image background processing;
adjusting image size and resolution;
image color removal processing;
heterogeneous image processing.

Figure 7:
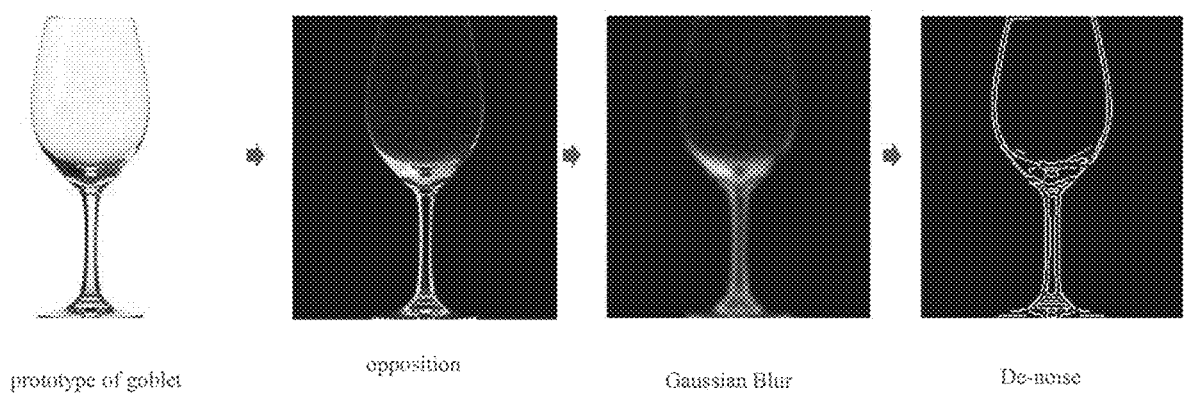
FIG. 7 shows a schematic diagram showing an image processing effect of the goblet in a preferred embodiment of the invention.
Figure 8:
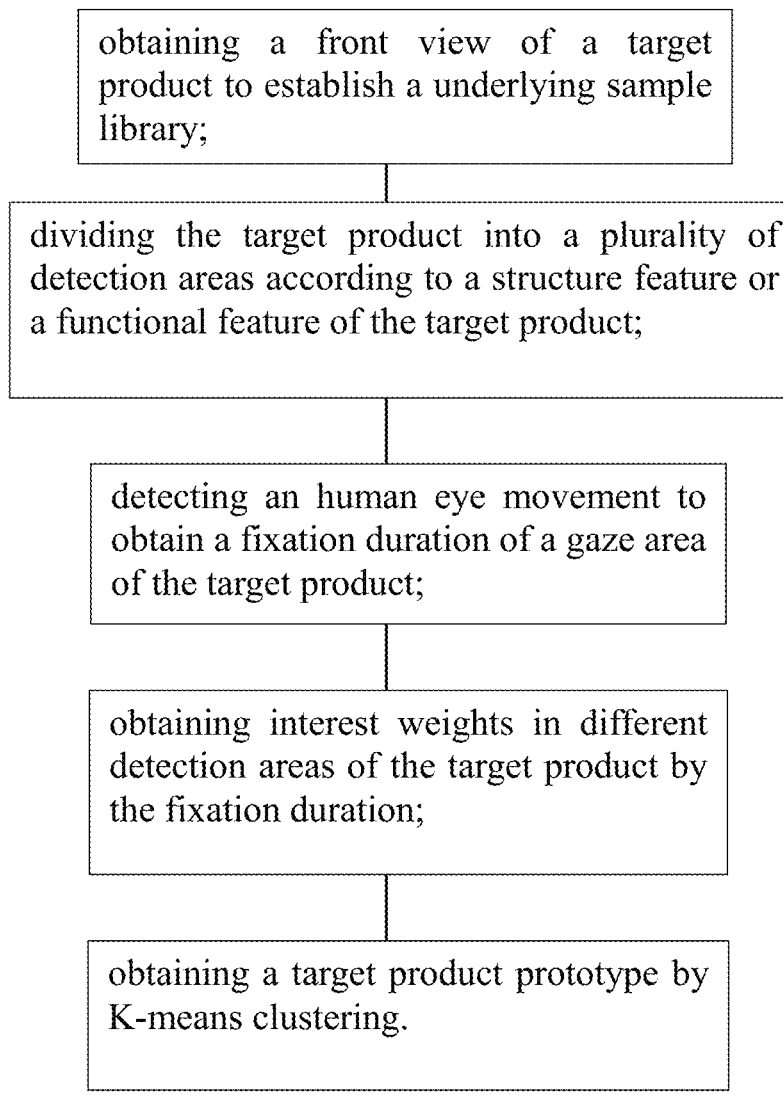
FIG. 8 shows a flow diagram of a method for obtaining a product prototype based on the human eye contour identification method of a preferred embodiment of the present invention.
Figure 9:
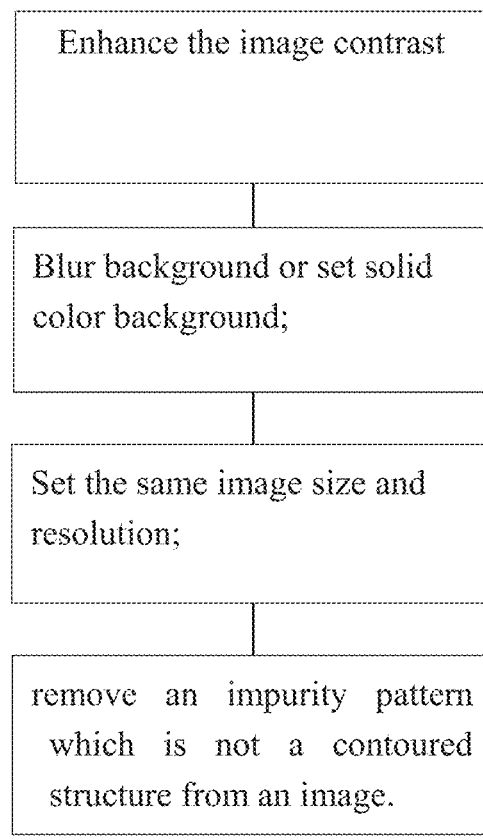
FIG. 9 shows a flow chart of the product interest identification method for a preferred embodiment of the invention.

Which enhancing image contrast can improve an efficiency of image identification of goblet, in particular, as shown in FIG. 7, the image is preprocessed by means of reverse, Gaussian blur, and noise reduction and so on, in order to identify the goblet contours and curves, it should be noted that the image processing operations such as reverse, Gaussian blur and noise reduction can be processed by existing image software, and the present invention is not redundant.

In order to avoid an influence of uncorrelated patterns and colors on the tester, the invention further discolors the goblet sample image by replacing the background color in the goblet sample image with black or white background color or solid color, and remove the non-contour structure in the sample image of the goblet, for example, in some original images, the goblet may have some decorative patterns, and also have a problem of the contour is not clear, perspective angle is too large, and so on, in order to avoid the influence of the decorative pattern on tester 4, the background and color pattern of the image are processed by Photoshop and other image processing software.

The invention further processes the resolution of the goblet sample image as the key factor of image identification, including the following steps:

Resizing the goblet sample images so that the same size and resolution is maintained between the goblet sample images. Further, in order to better identify goblet of contour curve and the feature points, a relevant product three-dimensional Cartesian coordinate system (x, y, z) is established, the products are placed in the three-dimensional Cartesian coordinate system, and the variables of a dimension of the Goblet Contour curve is limited according to the category of product, for example, in order to obtain a side view of the goblet, define the z-axis as a uniform data (e. g. 100 mm) so that all test goblets are scaled to the same scale.

The steps of image pre-processing also include the image processing of heterogeneous goblets, wherein the heterogeneous goblet is typically topologically transformed based on a symmetric goblet, and the closest prototype goblet is obtained based on the topological transformation.

Further, the invention may obtain true corner points by computer-controlled sieving, use a heuristic algorithm to obtain an optimal or suboptimal solution, and use a CANNY model to calculate edge contour feature points. The CANNY model is an existing algorithm, which will not be repeated herein.

In particularly, according to the embodiments disclosed herein, the process described above by reference to a flowchart may be implemented as a computer software program. For example, an embodiment of this disclosure includes a computer program product that includes a computer program hosted on a computer readable medium that contains program code for executing a method as shown in a flowchart. In such an embodiment, the computer program may be downloaded and installed from a network via a communication section, and/or installed from a removable medium. When the computer program is executed by the CPU of the Central Processing Unit, the above functions as defined in the method in this application are performed. It is necessary to explain that the computer readable medium can be a computer readable signal medium or a computer readable storage medium or any combination of the two. A computer-readable storage medium, such as a system, device, or device, or any combination thereof, that may be but not limited to electrical, magnetic, optical, electromagnetic, infrared, or semiconductor. More specific examples of computer readable storage media may include but are not limited to: electrical connections with one or more conductors, portable computer disks, hard disks, random access memory RAM, read-only memory, erasable programmable read-only memory EPROM or flash memory, optical fibers, portable compact Disk read-only memory, optical storage devices, magnetic storage devices, or any appropriate combination of the above. In the present application, a computer readable storage medium may be any tangible medium containing or storing a program that may be used by or in combination with an instruction execution system, device, or device. In the present application, a computer readable signal medium may include a data signal transmitted in a baseband or as part of a carrier wave carrying a computer readable program code. Such data signals can take many forms, including but not limited to electromagnetic signals, optical signals, or any of the above-mentioned combinations. A computer-readable signal medium may be any computer-readable medium other than a computer-readable storage medium, the computer readable medium may transmit, propagate, or transmit a program for use by or in combination with an instruction execution system, device, or device. The program code contained in a computer readable medium may be transmitted in any suitable medium, including but not limited to: Wireless, wire, optical cable, RF, etc., or any combination of the above.

The flowcharts and block diagrams in the attached drawings illustrate the possible architectures, functions and operations of the systems, methods, and computer program products according to the various embodiments of the invention. At this point, each box in a flowchart or block diagram can represent a module, program segment, or part of code, the module, program segment, or part of code contains one or more executable instructions for performing specified logical functions. It should also be noted that in some alternative implementations, the functions noted in the box can also occur in a different order than those noted in the accompanying diagram. For example, two contiguous representations of boxes can actually be executed in substantially parallel, or they can sometimes be executed in reverse order, depending on the function involved. Note also that each box in a block and/or flowchart and/or combination of boxes in a block and/or flowchart can be implemented using a dedicated hardware-based system that performs specified functions or operations, or it can be implemented by combining dedicated hardware with computer instructions.

The technical personnel in this field shall understand that the embodiments of the present invention as described above and shown in the drawings are examples only and do not restrict the present invention, and that the object of the present invention has been fully and effectively realized, the functional and structural principle of the invention has been shown and explained in an embodiment, and the embodiment of the invention can be deformed or modified without deviating from the principle.

What is claimed is:

1. A method for obtaining a product prototype based on an eye movement data, comprising:
    obtaining a front view of a target product to establish an underlying sample library;
    dividing the target product into a plurality of detection areas according to a structure feature or a functional feature of the target product;
    identifying an edge contour of the target product to obtain a Bezier curve with feature points;
    obtaining coordinate values of the feature points, the feature points comprising cut points, corner points, inflection points and endpoints;
    detecting a human eye movement to obtain a fixation duration of a gaze area of the target product;
    obtaining interest weights in different detection areas of the target product by the fixation duration;
    multiplying each interest weight and a coordinate value of a corresponding feature point clustering the detection areas to obtain a category sample set; and
    obtaining a target product prototype by K-means clustering according to the number of the category sample set as a target condition.

2. The method for obtaining the product prototype based on the eye movement data according to claim 1, wherein a step of obtaining a target product prototype comprises: classifying samples in each category sample set by K-means clustering; calculating a coordinate average value of each category sample set to obtain a centroid of each category sample set, calculating a distance between each sample point and the centroid to obtain a prototype sample point closest to the centroid, and calculating a coordinate value of the prototype sample point.

3. The method for obtaining the product prototype based on the eye movement data according to claim 2, wherein a step of obtaining prototype samples comprises analyzing a heterogeneous product image through a topological relationship of geometric graphics to obtain prototype features of the heterogeneous products.

4. The method for obtaining the product prototype based on the eye movement data according to claim 2, wherein the step of K-means clustering further comprises calculating of a total variance of a combined sample, and the combined sample is merged from small to large according to total variances of different samples.

5. The method for obtaining the product prototype based on the eye movement data according to claim 1, wherein obtaining the product prototype comprises: pre-establishing a product prototype system based on the functional feature and/or the structural feature of the product; analyzing the functional feature and structural feature of prototype samples; and classifying the prototype samples.

6. The method for obtaining the product prototype based on the eye movement data according to claim 1, wherein the step of establishing the underlying sample library further comprises a sample pre-processing steps:
    enhancing an image contrast;
    blurring a background or setting a solid color background;
    setting a same image size and a same resolution; and
    removing an impurity pattern from an image, and the impurity pattern is not a contoured structure.

7. The method for obtaining the product prototype based on the eye movement data according to claim 1, wherein the step of obtaining the Bezier curve further includes a corner points screening step:
    detecting and obtaining numerical values of the feature points, wherein the feature points comprise true corner points and false corner points;
    calculating a curvature value between each feature point and a point adjacent to the feature point, if the curvature value of one feature point is a maxima value, the one feature point is assigned as a candidate corner point; and
    setting a curvature threshold value and screening a true corner point by the curvature threshold value, and dynamically setting the curvature threshold value according to a product category.

* * * * *